United States Patent
Ishibashi et al.

(10) Patent No.: US 6,397,525 B1
(45) Date of Patent: Jun. 4, 2002

(54) SEALING ASSEMBLY FOR A VEHICLE DOOR INCLUDING A WEATHER STRIP AND A DASHER SEAL

(75) Inventors: Hiroshi Ishibashi, Hiroshima; Jiro Yamaguchi, Wako, both of (JP)

(73) Assignees: Nishikawa Rubber Co., Ltd., Hiroshima; Honda Giken Kogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/624,426

(22) Filed: Jul. 24, 2000

(30) Foreign Application Priority Data

Sep. 3, 1999  (JP) ............................................ 11-249521

(51) Int. Cl.[7] ................................................. E06B 7/16
(52) U.S. Cl. ..................... 49/484.1; 49/495.1; 49/475.1
(58) Field of Search ............................. 49/495.1, 484.1, 49/498.1, 475.1, 492.1

(56) References Cited

U.S. PATENT DOCUMENTS

| | | | | |
|---|---|---|---|---|
| 4,495,186 A | * | 1/1985 | Tuchiya et al. | 296/146.9 |
| 4,549,761 A | * | 10/1985 | Lee et al. | 296/206 |
| 4,901,476 A | * | 2/1990 | Nagashima et al. | 49/475.1 |
| 5,042,200 A | * | 8/1991 | Ugawa | 49/490.1 |
| 5,154,952 A | * | 10/1992 | Nozaki | 428/37 |
| 5,307,591 A | * | 5/1994 | Usuta et al. | 49/476.1 |
| 5,331,768 A | * | 7/1994 | Takeuchi | 49/493.1 |
| 5,347,758 A | * | 9/1994 | Yamane | 49/484.1 |
| 5,462,292 A | * | 10/1995 | Yamane | 277/642 |
| 5,715,632 A | * | 2/1998 | Nozaki | 49/475.1 |
| 5,806,247 A | * | 9/1998 | Yamamoto | 49/495.1 |
| 5,918,421 A | * | 7/1999 | Nozaki | 49/492.1 |
| 6,099,068 A | * | 8/2000 | Kim | 296/146.9 |
| 6,131,341 A | * | 10/2000 | Wade et al. | 49/478.1 |

FOREIGN PATENT DOCUMENTS

| | | |
|---|---|---|
| JP | 1-83612 | 6/1989 |
| JP | 6-171376 | 6/1994 |

* cited by examiner

Primary Examiner—Gregory J. Strimbu
(74) Attorney, Agent, or Firm—Flynn, Thiel, Boutell & Tanis, P.C.

(57) ABSTRACT

A seal structure mounted to an attachment stage of a car door panel comprising a weather strip and a dasher seal. The attachment stage includes a horizontal wall part at a lower end of the door panel and a vertical wall part provided continuously from the horizontal wall part at the lower end of the door panel. The weather strip has a base part that is attached to the horizontal wall part and a hollow part that elastically contacts a body panel of the car. The dasher seal has a base part that is attached to the vertical wall part and contacts the weather strip and a lip part that elastically contacts the body panel.

5 Claims, 3 Drawing Sheets

BASE PART

SEALING ASSEMBLY FOR A VEHICLE DOOR INCLUDING A WEATHER STRIP AND A DASHER SEAL

FIELD OF THE INVENTION

The invention relates to a seal structure of a lower part of a car door.

BACKGROUND OF THE INVENTION

There is provided a mudguard or dasher seal as well as a weather strip at the lower part of the door of a car (hereinafter referred to as car door) for preventing the entrance of mud or noise from a road into the car interior. As shown in FIGS. 4 and 5, a door panel 10a has a second difference in level (hereinafter referred to as second stage) 51 for exclusive use to remove mud in which a dasher seal 40a is attached. FIG. 4 shows clips 15a, 16a for attaching a weather strip 30a and the dasher seal 40a to the door panel 10a. Fixed body panel 20a is oriented toward the indoor side 60a as opposed to the outdoor side 70a of the door panel 10a. FIG. 5 shows a double-faced adhesive tape 53 attaching the weather strip 30a and the dash seal 40a to the door panel 10a. In addition, FIG. 5 shows a first difference in level (hereinafter referred to as first stage) 50, to which a weather strip 30a is attached. The dasher seal 40a can also be attached to the door panel 10a by way of a lower mold 52 as shown in FIG. 6.

However, the conventional seal structure having the second stage 51 provided at the door panel 10a for exclusive use of the dasher seal 40a has drawbacks in that the molding of the door panel 10a becomes complex, a wider space for attaching the seal member therein is needed, and the opening area of a car door is narrowed, resulting in a problem when getting into and out of a car. The conventional seal structure having the second stage 51 attached to the door panel 10a by way of the lower mold 52 has drawbacks in that an additional part, i.e. the lower mold 52 is needed and an extra operation for attaching the lower mold 52 to the door panel 10a is needed. Further it is troublesome to attach the dasher seal 40a to the lower mold 52.

It is an object of the invention to solve the problems of the conventional seal structure of a lower part of a car provided with the weather strip 30a and dasher seal 40a, namely, to solve the problem of the inconvenience of getting into and out from a car and inferior productivity caused by the provision of the second stage 51 for exclusive use of the dasher seal 40a to the door panel 10a and the attachment of the lower mold 52 to the door panel 10.

SUMMARY OF THE INVENTION

A seal structure of a lower part of a car door according to a first aspect of the invention includes an attachment stage 11 composed of a horizontal wall part 12 provided at the lower end of a door panel 10 on the indoor side 60 and a vertical wall part 13 provided continuously from the horizontal wall part 12 at the lower end of the door panel 10 on the outdoor side 70. A weather strip 30 includes a base part 31 attached to the horizontal wall part 12 and a hollow part 32 for elastically contacting a body panel 20. A dasher seal 40 includes a base part 41 that is attached to the vertical wall part 13 and contacts the weather strip 30 and a lip part 42 that elastically contacts the body panel 20.

A seal structure of a lower part of a car door according to a second aspect of the invention is characterized in that in the first aspect of the invention, the base part 31 of the weather strip 30 has a protrusion 33 on the outdoor side surface thereof and the hollow part 32 of the weather strip 30 has a sealing piece 34 protruded therefrom on the outdoor side surface thereof. The protrusion 33 and sealing piece 34 are forced to elastically contact the base part 41 of the dasher seal 40 on the indoor side surface thereof. The lip part 42 of the dasher seal 40 has a first protrusion 43 protruding from the root thereof on the outdoor side surface and the base part 41 of the dasher seal 40 has a second protrusion 44 provided upright from the upper end thereof on the indoor side surface. When the door is closed, the first protrusion 43 is forced to elastically contact a horizontal continuous part 14 continuous from the vertical wall part 13 of the door panel 10 on the outdoor side, and the second protrusion 44 is forced to elastically contact the horizontal wall part 12 of the door panel 10.

PREFERRED EMBODIMENT OF THE INVENTION

Figure 1:
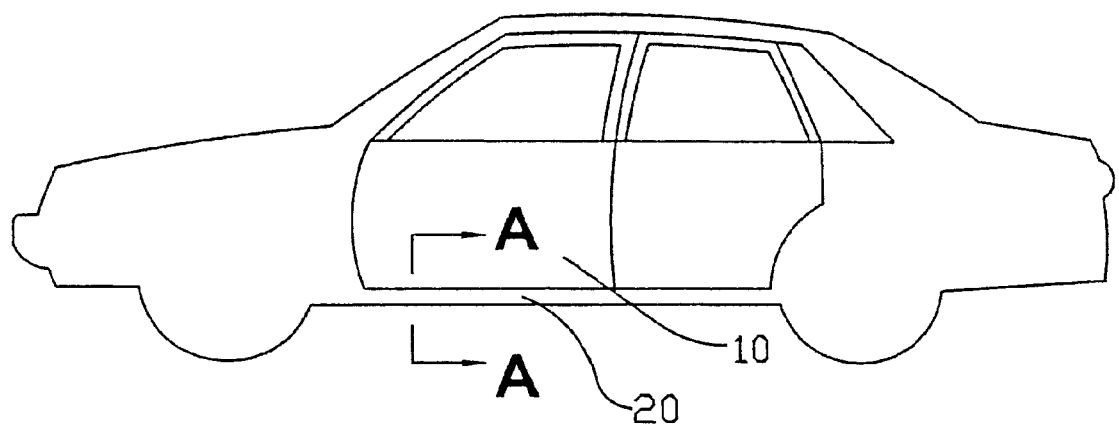
FIG. 1 is a side view of a car.
Figure 2:
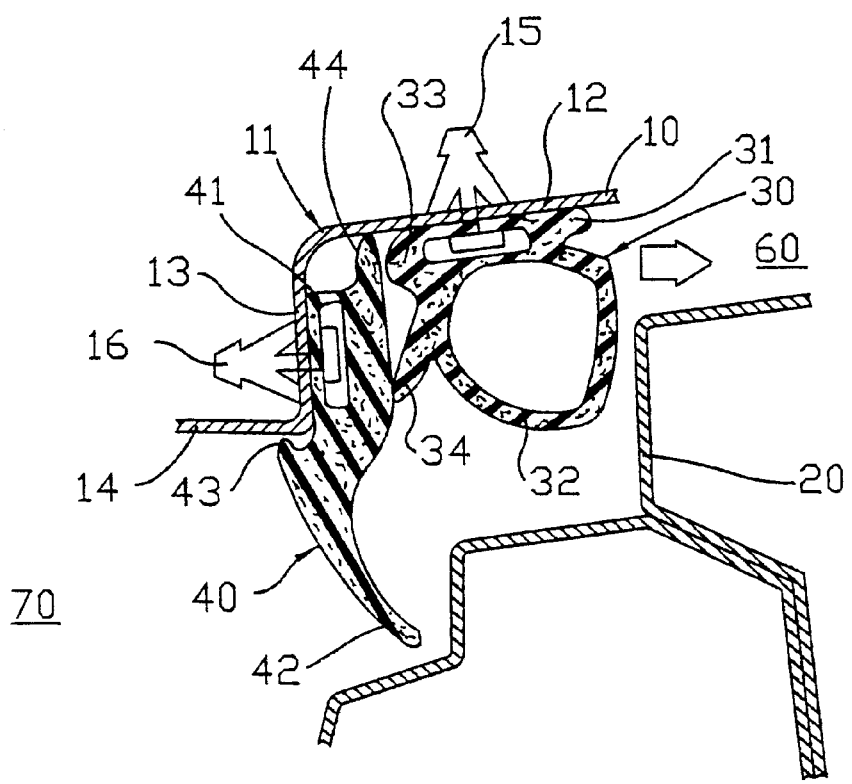
FIG. 2 is a sectional view of a car taken along lines A—A in FIG. 1 when a car door is open according to a seal structure of a preferred embodiment of the invention.
Figure 3:
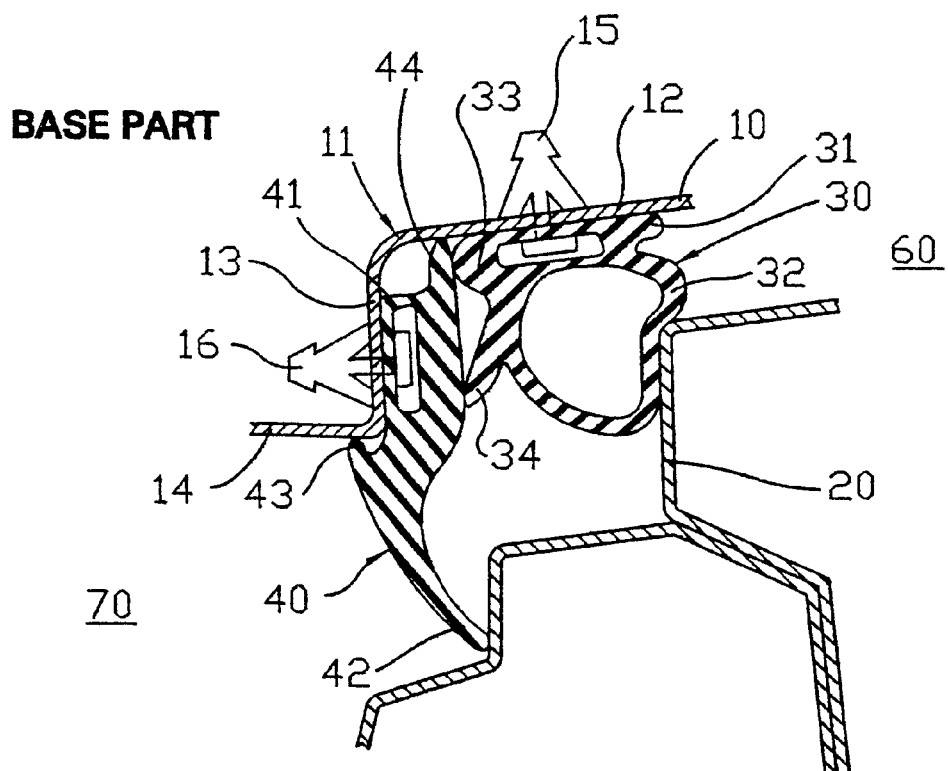
FIG. 3 is a sectional view of a car taken along lines A—A in FIG. 1 when a car door is closed according to a seal structure of a preferred embodiment of the invention.
Figure 4:
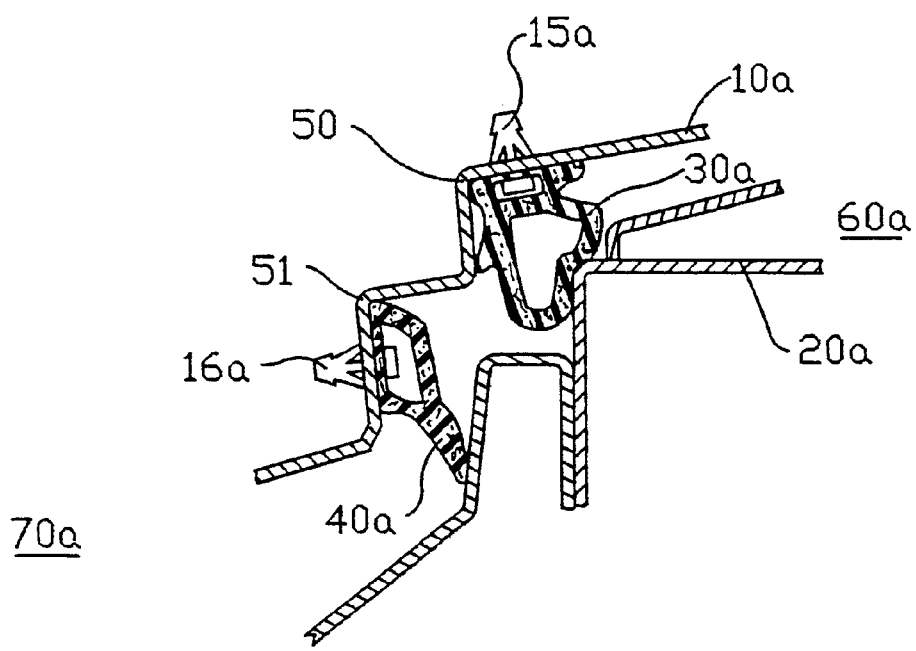
FIG. 4 is a sectional view of a car taken along lines A—A in FIG. 1 according to a first conventional seal structure.
Figure 5:
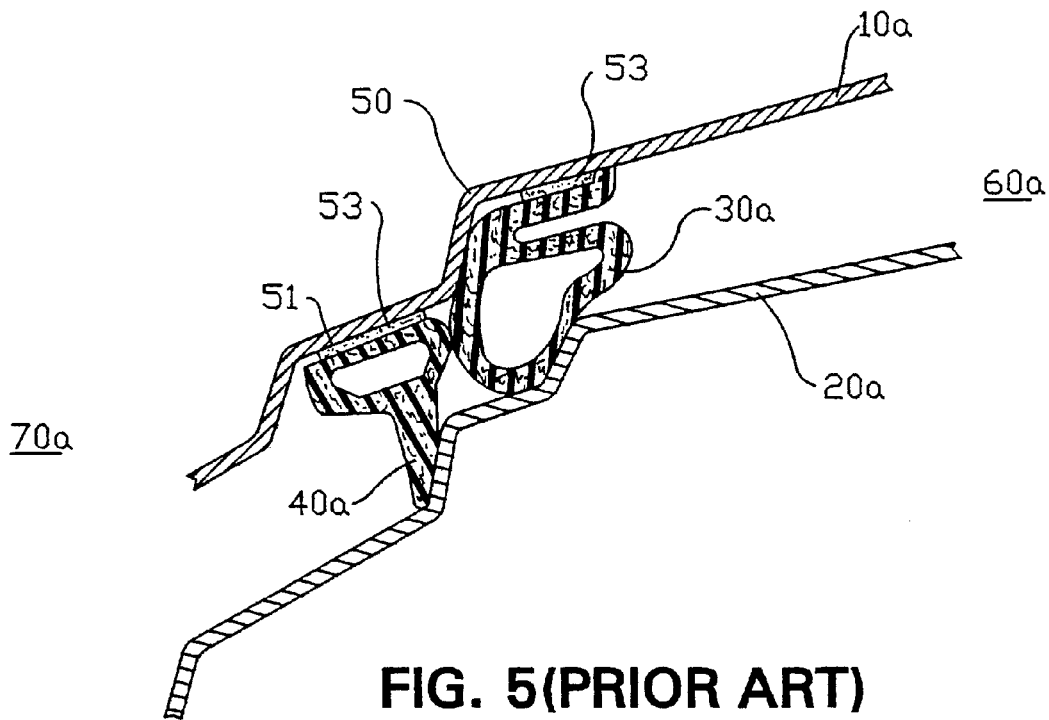
FIG. 5 is a sectional view of a car taken along lines A—A in FIG. 1 according to a second conventional seal structure.
Figure 6:
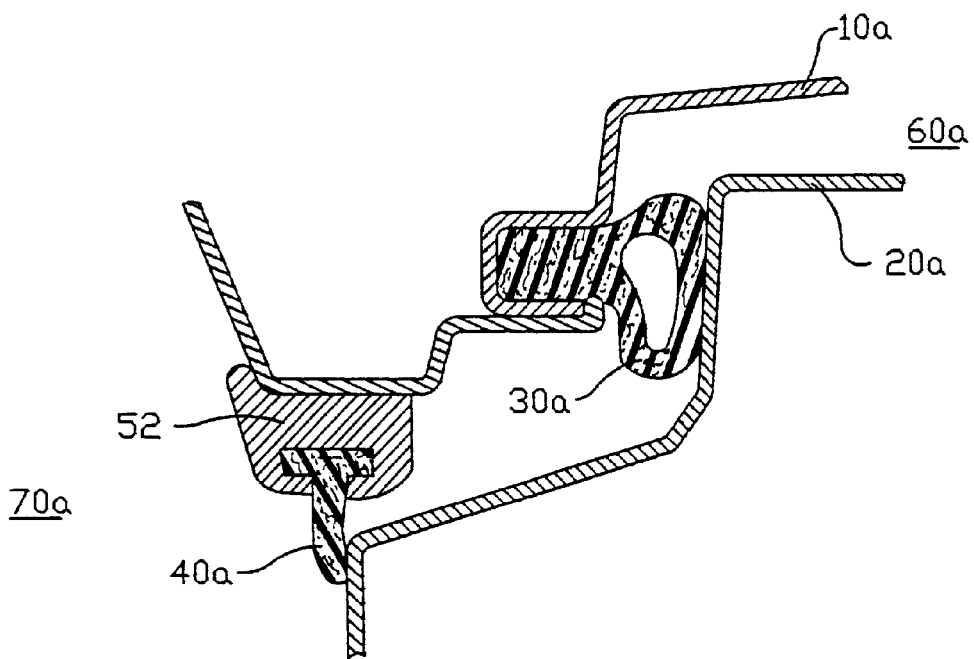
FIG. 6 is a sectional view of a car taken along lines A—A in FIG. 1 according to a third conventional seal structure.

A seal structure of a lower part of a car door according to the preferred embodiment of the invention has an attachment stage 11 comprising a horizontal wall part 12 provided at the lower end of a door panel 10 on the indoor side thereof 60 and a vertical wall part 13 provided continuously from the horizontal wall part 12 at the lower end of the door panel 10 on the outdoor side thereof 70.

A weather strip 30 includes a hollow part 32 that elastically contacts a body panel 20. A base part 31 of the weather strip 30 is attached to the horizontal wall part 12 by a clip 15. A dasher seal 40 includes a lip part 42 that elastically contacts the body panel 20 and also contacts the weather strip 30. A base part 41 of the dasher seal 40 is attached to the vertical wall part 13 by a clip 16.

Although the weather strip 30 and dasher seal 40 are attached to the single attachment stage 11 of the door panel 10 by the clip 15 or 16, they may be attached to the attachment stage 11 by a double-faced adhesive tape. Since both the weather strip 30 and the dasher seal 40 are attached to the attachment stage 11 of the door panel 10 in the seal structure of the lower part of the car door according to the preferred embodiment of the invention, it is not necessary to form the second stage 51 for exclusive use of the conventional dasher seal 40. Accordingly, the door panel can be easily press-molded, and the space in which the seal member is attached can be reduced, and further an opening area of the car door becomes large, thereby allowing a person to easily get into and out of the car. Still further, since the lower mold 52 is not needed, an extra member is not needed, thereby dispensing with the attachment operation thereof.

Further, in the seal structure of a lower part of a car door according to the preferred embodiment of the invention, the base part 31 of the weather strip 30 has a protrusion 33 on the outdoor side surface thereof and the hollow part 32 of the weather strip 30 has a sealing piece 34 protruded therefrom on the outdoor side surface thereof, wherein the protrusion 33 and sealing piece 34 are forced to elastically contact the base part 41 of the dasher seal 40 on the indoor side surface thereof. Further, the lip part 42 of the dasher seal 40 has a first protrusion 43 protruding from the root thereof on the outdoor side surface and the base part 41 of the dasher seal 40 has a second protrusion 44 provided upright from the upper end thereof on the indoor side surface. At least when the door is closed, the first protrusion 43 is forced to elastically contact a horizontal continuous part 14 continuous from the vertical wall part 13 of the door panel 10 on the outdoor side and the second protrusion 44 is forced to elastically contact the horizontal wall part 12 of the door panel 10.

In the seal structure of a lower part of a car door according to the preferred embodiment of the invention, since the protrusion 33 and sealing piece 34 provided respectively on the weather strip 30 are forced to elastically contact the base part 41 of the dasher seal 40, elastic contact force of both the protrusion 33 and sealing piece 34 relative to the base part 41 increases when the door is closed. As a result, the weather strip 30 and dasher seal 40 are brought into more intimate contact with each other, thereby enhancing sealing effect so that mud or noise from a road is effectively prevented in advance from entering into the vehicle interior.

Still further, in the seal structure of a lower part of a car door according to the preferred embodiment of the invention, since the first protrusion 43 is provided on the dasher seal 40, in the case that the first protrusion 43 is forced to elastically contact the body panel 20 when the door is closed, the first protrusion 43 strikes against the horizontal continuous part 14. As a result, a repulsion force of the lip part 42 against the body panel 20 increases, so that the lip part 42 is forced to elastically strongly contact the body panel 20, thereby obtaining high sealing effect.

Further, the second protrusion 44 is provided in addition to the first protrusion 43. The first protrusion 43 is forced to elastically strongly contact the horizontal continuous part 14. The second protrusion 44 is pressed by the protrusion 33 so that the second protrusion 44 is forced to strongly contact the horizontal wall part 12. As a result, the dasher seal 40 is rendered fixed by the first protrusion 43 and second protrusion 44 as well as by the clip 16, and keeps a stabilized position, thereby preventing the occurrence of a so-called turning or tumbling of the lip part 42. Both the first protrusion 43 and second protrusion 44 are very effective for securing the stabilized position of the dasher seal 40 when fixing the dasher seal 40 by the clip 16. It is a matter of course that both the first protrusion 43 and second protrusion 44 are also effective when the dasher seal 40 is attached to the attachment stage 11 of the door panel 10 by a double-faced adhesive tape.

In the seal structure of a lower part of a car door according to the first aspect of the invention, inasmuch as both the weather strip 30 and the dasher seal 40 are attached to the single attachment stage 11 of the door panel 10, the door panel 10 can be easily press-molded, and the space in which the seal member is attached can be reduced. Further an opening area of the car door becomes large, thereby allowing a person to easily get in and out of the car. Further, inasmuch as the lower mold 52 is not needed, an extra member is not needed, thereby dispensing with the attachment operation thereof, so that productivity is enhanced.

In the seal structure of a lower part of a car door according to the second aspect of the invention, inasmuch as the protrusion 33 and sealing piece 34 provided respectively on the weather strip 30 are forced to elastically contact the base part 41 of the dasher seal 40, the weather strip 30 and dasher seal 40 are brought into more intimate contact with each other, thereby enhancing sealing effect so that mud or noise from a road is effectively prevented in advance from entering into the car interior.

Further, inasmuch as the first protrusion 43 is provided on the dasher seal 40, a repulsion force of the lip part 42 against the body panel 20 increases, so that the lip part 42 is forced to elastically strongly contact the body panel 20, thereby obtaining high sealing effect.

Still further, inasmuch as the second protrusion 44 is provided in addition to the first protrusion 43, the dasher seal 40 is rendered fixed by the first protrusion 43 and second protrusion 44 as well as by the clip 16, and keeps a stabilized position, thereby preventing the occurrence of a so-called turning or tumbling of the lip part 42.

What is claimed is:

1. A combination of a sealing assembly and a car door, the car door comprising a door panel including an attachment stage provided at a lower end of the door, the attachment stage comprising a genarally horizontal wall part and a generally vertical wall part provided continuously from the generally horizontal wall part the sealing assembly comprising a weather strip and a dasher seal, the weather strip having a strip base part attached to the horizontal wall part and a hollow part for elastically contacting a fixed body panel, the strip base part including a weather strip protrusion on an outdoor side of the strip base part and the hollow part having a sealing piece protruding therefrom on an outdoor side of the hollow part;

the dasher seal having a seal base part attached to the vertical wall part for elastically contacting the weather strip protrusion and the sealing piece, the dasher seal including a lip part for elastically contacting the fixed body panel, the lip part including a first dasher seal protrusion protruding from a root of the lip part on an outdoor side of the lip part, and the seal base part of the dasher seal including a second dasher seal protrusion extending upwardly from an upper end of the seal base part on an indoor side of the seal base part; and the attachment stage further comprising a generally horizontal continuous part extending outwardly from a lower end of the vertical wall part of the door panel, wherein, in use, the first dasher seal protrusion elastically contacts the horizontal continuous part and the second dasher seal protrusion elastically contacts the horizontal wall part of the door panel.

2. In combination, a sealing assembly, a car door panel of a car door and a car body panel, the car door panel comprising a single attachment stage consisting of a generally horizontal wall part provided at a lower end of the door panel and having a first portion extending toward an outdoor side of the door, and a second portion extending toward an indoor side of the door and generally a vertical wall part provided continuously between first end second portion of the horizontal wall part and extending substantially perpendicularly with respect to the horizontal wall part;

the sealing assembly comprising a weather strip and a dasher seal, the a weather strip having a base part attached to the second portion of the horizontal wall part and a hollow part for elastically contacting the body panel, the base part of the weather strip including a weather strip protrusion on an outdoor side of the base part, and the hollow part of the weather strip including a sealing piece on an outdoor side of the hollow part and spaced from the weather strip protrusion; and the dasher seal having a base part attached to the vertical wall part and elastically contacting the weather strip, the dasher seal including a lip part elastically contacting the body panel when the car door is closed, wherein the weather strip protrusion and the sealing piece both elastically contact the dasher seal at spaced locations to form separate first and second seals.

3. A combination of a sealing assembly and a car door, the car door comprising a door panel including an attachment stage comprising a generally horizontal wall part provided at a lower end of the door panel and a generally vertical wall part provided continuously from the horizontal wall part at the lower end of the door panel;

the sealing assembly comprising a weather strip and a dasher seal, the weather strip having a strip base part attached to the horizontal wall part and a hollow part for elastically contacting a fixed body panel, the strip base part including a weather strip protrusion on an outdoor side of the strip base part, and the hollow part including a sealing piece protruding therefrom on an outdoor side of the hollow part and spaced from the weather strip protrusion; and the dasher seal having a seal base part attached to the vertical wall part and elastically contacting both the weather strip protrusion and the sealing piece at spaced locations to form first and second spaced seals, the dasher seal including a lip part for elastically contacting the fixed body panel.

4. The combination of claim 3, wherein the lip part includes a first dasher seal protrusion protruding from a root of the lip part on an outdoor side of the lip part, and the seal base part of the dasher seal includes a second dasher seal protrusion extending upwardly from an upper end of the seal base part on an indoor side of the seal base part;

wherein, in use, the second protrusion elastically contacts the horizontal wall part of the door panel.

5. The combination of claim 4, wherein the attachment stage further includes a horizontal continuous part extending outwardly from the vertical wall part of the door panel on an outdoor side of the vertical wall part, wherein in use, the first dasher seal protrusion elastically contacts the horizontal continuous part.

\* \* \* \* \*